United States Patent [19]

Halmess et al.

[11] Patent Number: 4,725,664

[45] Date of Patent: Feb. 16, 1988

[54] IMPACT MODIFIED POLYESTER

[75] Inventors: C. B. Halmess, Kleberg; Lindsey C. Deal, Nueces, both of Tex.

[73] Assignee: Celanese Corporation, New York, N.Y.

[21] Appl. No.: 889,053

[22] Filed: Jul. 22, 1986

[51] Int. Cl.$^4$ .................. C08G 63/60; C08G 59/00
[52] U.S. Cl. .................................. 528/176; 528/87; 528/100
[58] Field of Search .................. 528/87, 100, 176

[56] References Cited

U.S. PATENT DOCUMENTS 4,067,850  1/1978  Kohler et al. .................. 528/176
4,156,774  5/1979  Buxbaum et al. .................. 528/176
4,511,708  4/1985  Kasuga et al. .................. 528/176

Primary Examiner—Lucille M. Phynes
Attorney, Agent, or Firm—Burns, Doane, Swecker & Mathis

[57] ABSTRACT

Provided is an impact modified copolyester prepared from a reaction of an aromatic dicarboxylic acid component and a diol component. The aromatic dicarboxylic acid component is terephthalic acid or an ester derivative thereof, and the diol component comprises a mixture of 1,4 butanediol and an alkoxylated bisphenol A. The combination of the 1,4 butanediol and alkoxylated bisphenol A provides for a polyester exhibiting superior impact properties.

12 Claims, 5 Drawing Figures

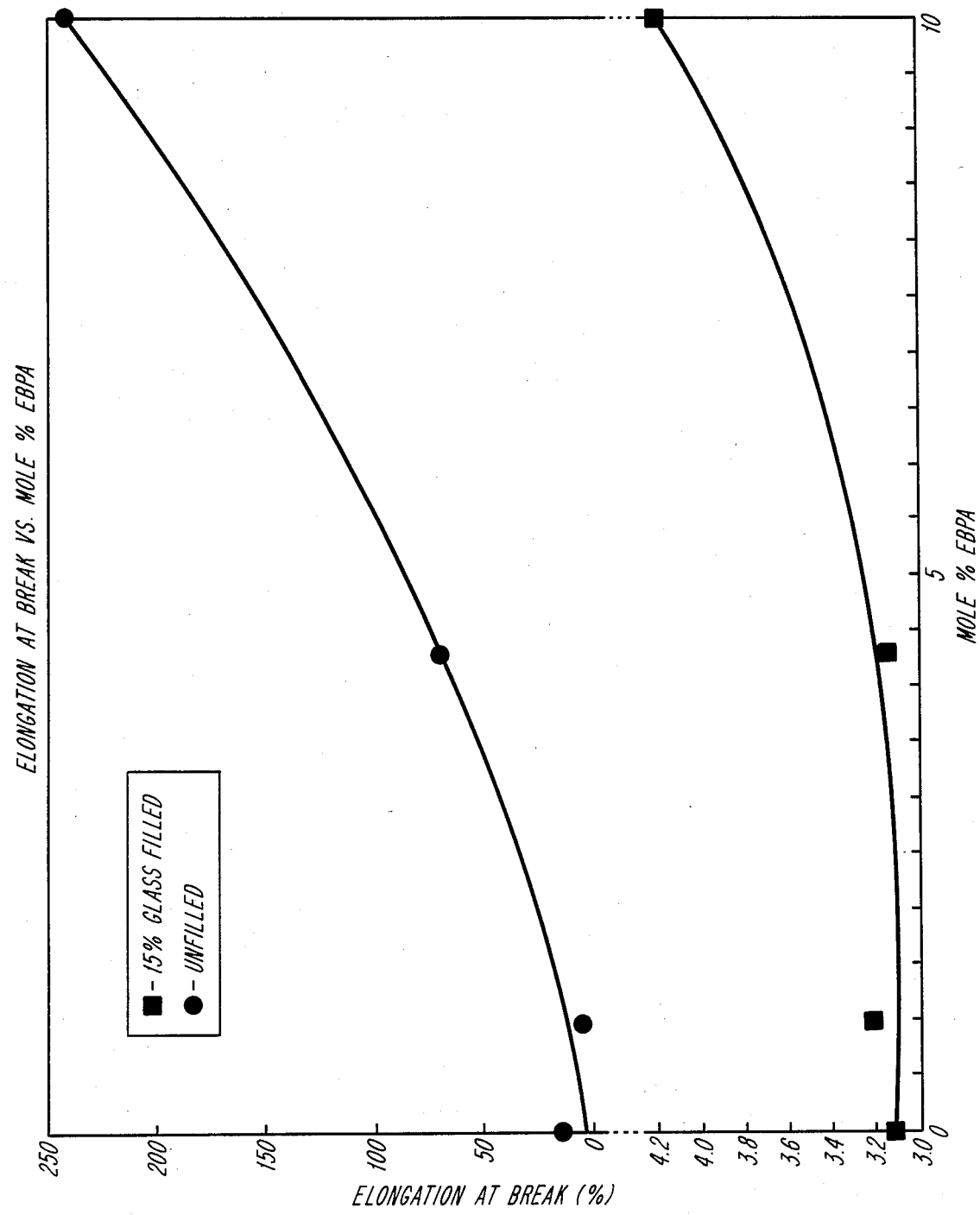

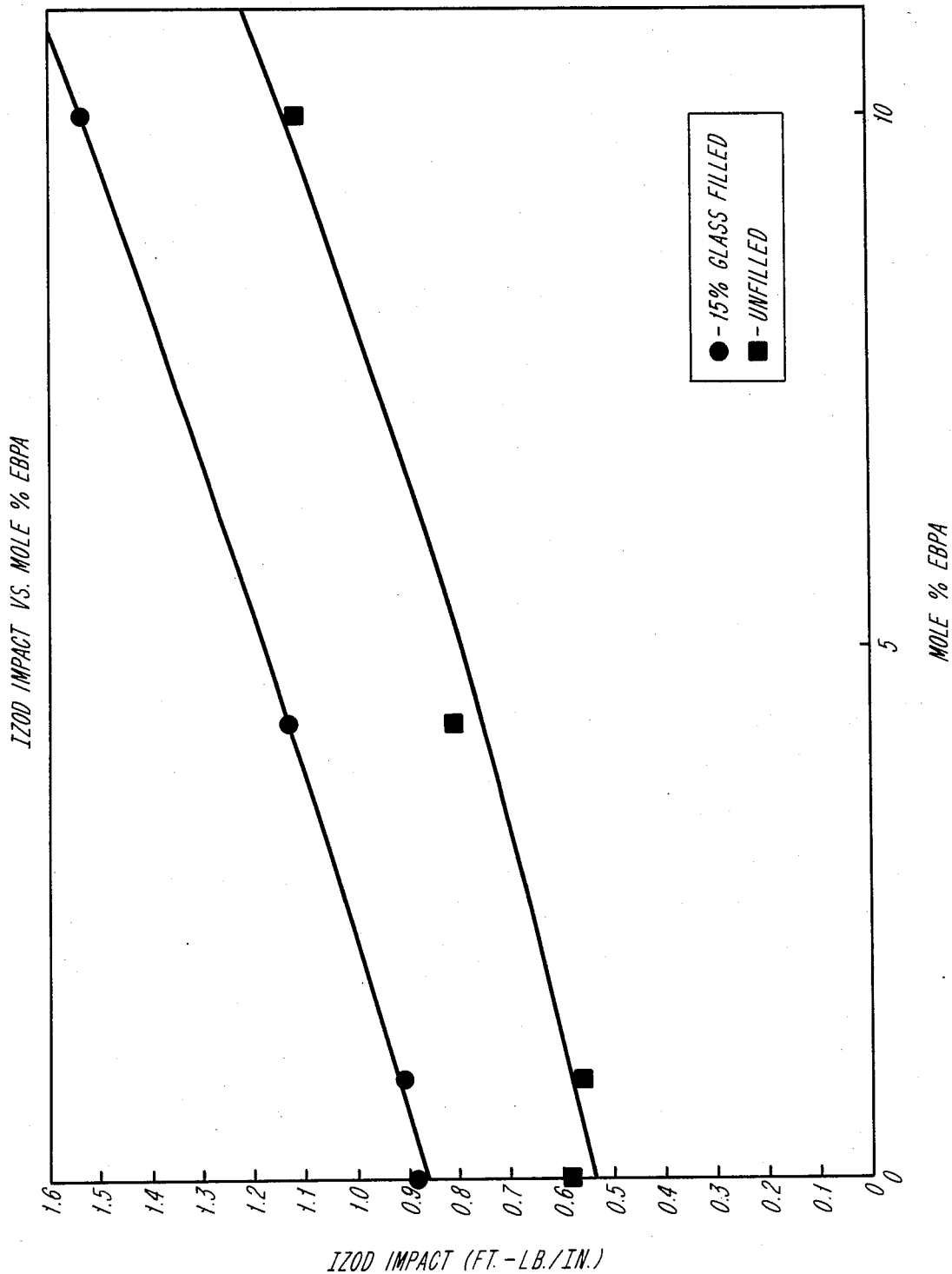

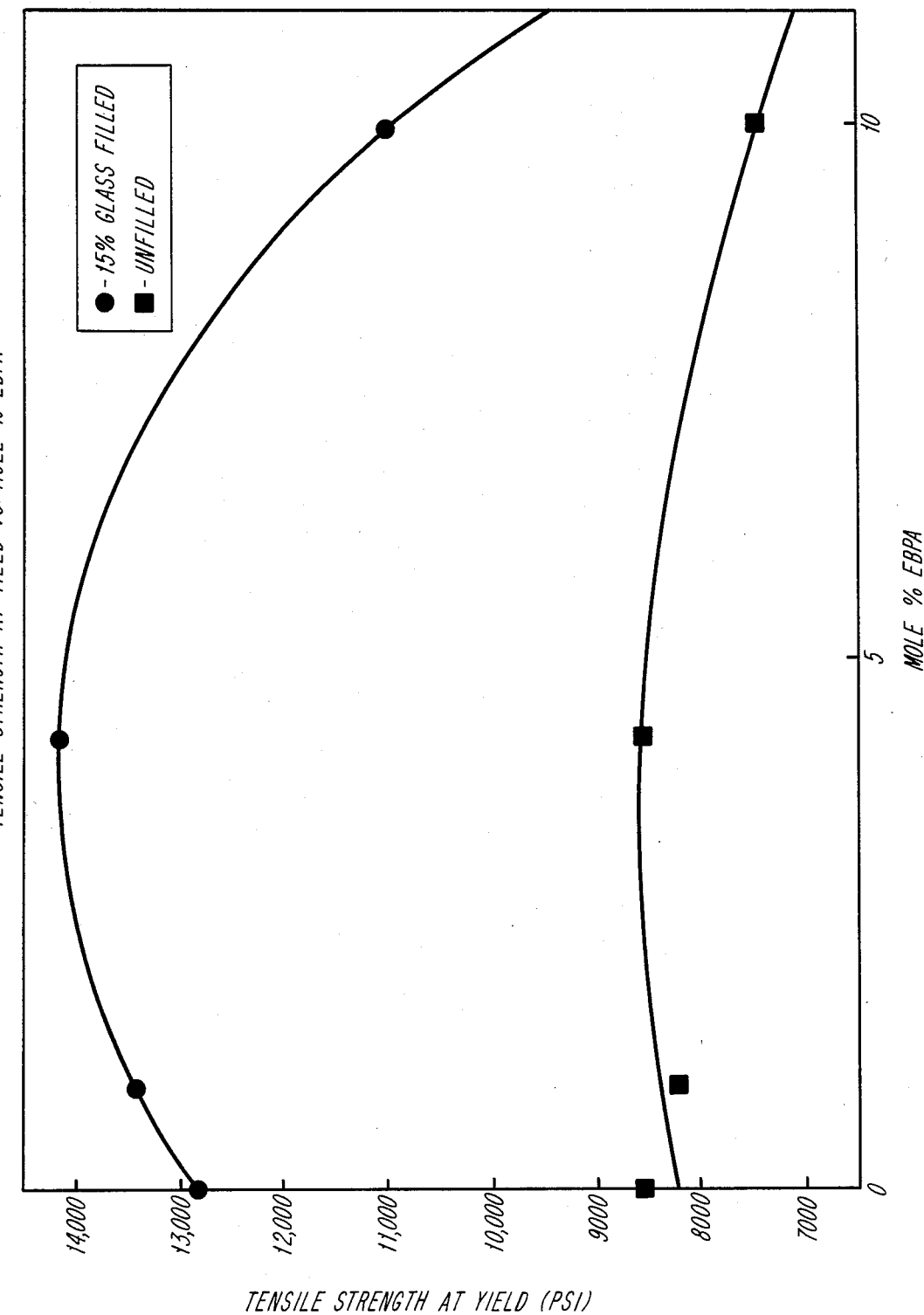

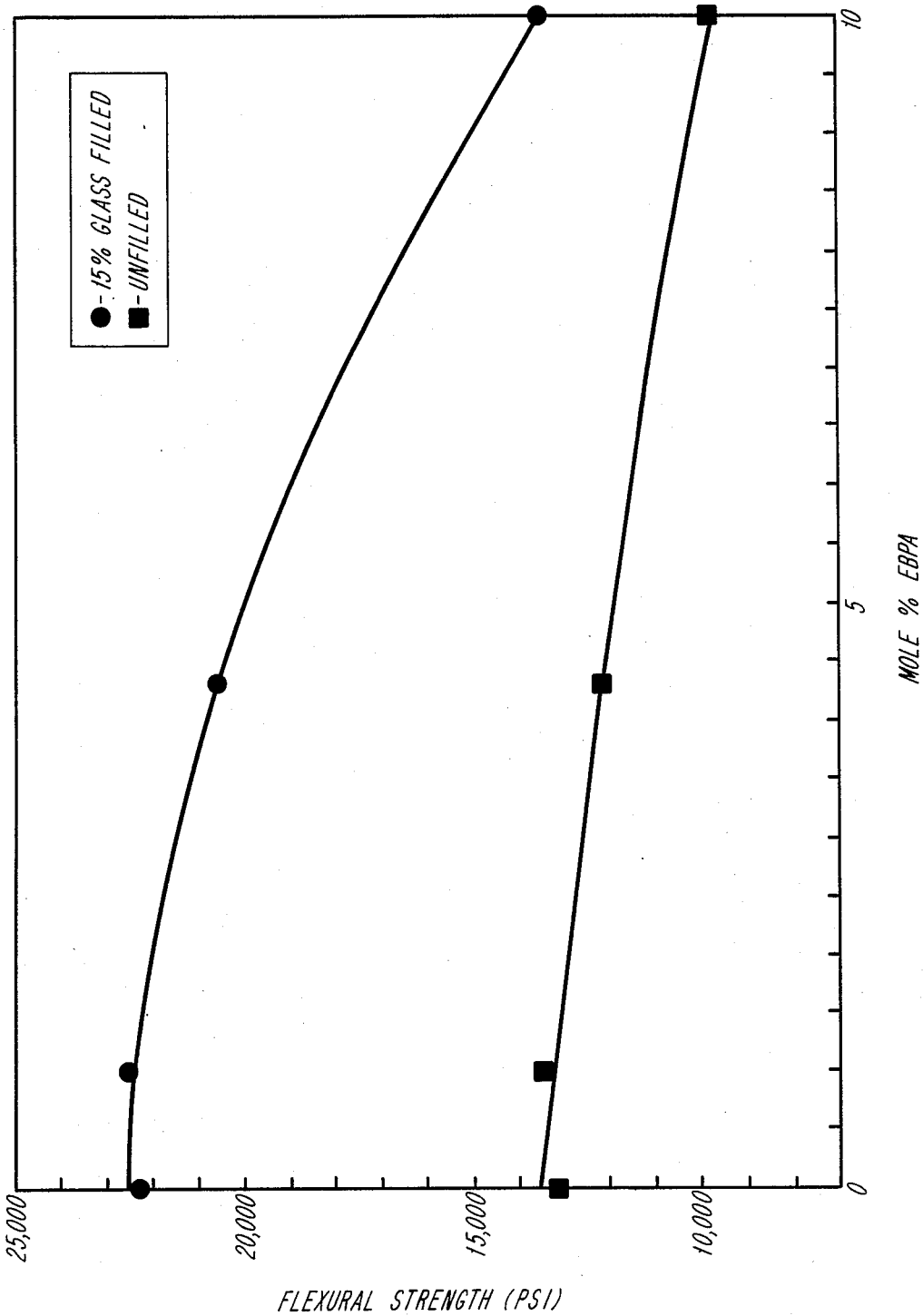

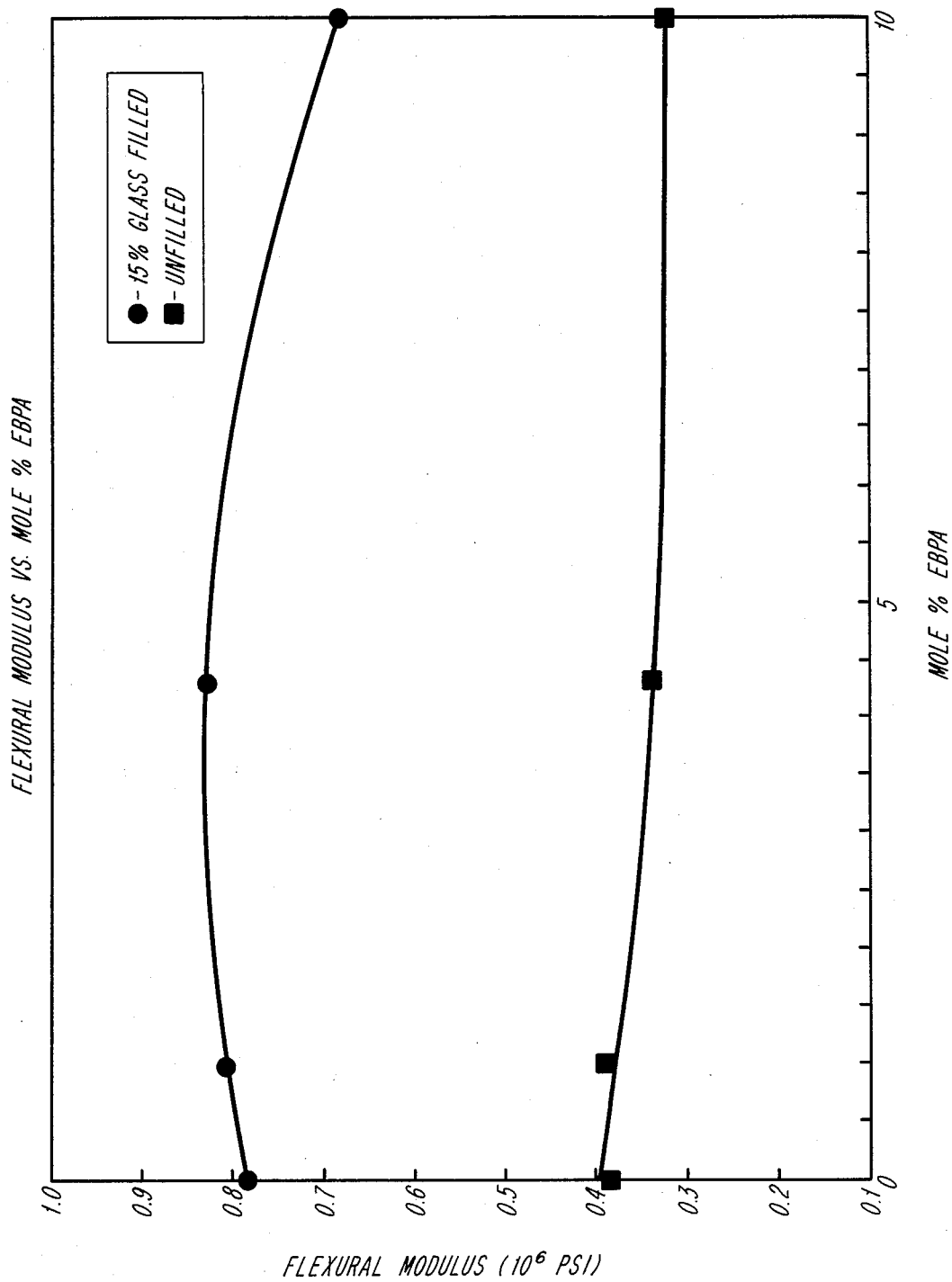

IMPACT MODIFIED POLYESTER

BACKGROUND OF THE INVENTION

1. Field of the Invention

The present invention relates to polyesters prepared from an aromatic dicarboxylic acid component and a diol component. More particularly, the present invention relates to polyesters prepared from terephthalic acid or an ester derivative thereof and a diol component comprising 1,4 butanediol, which polyester exhibits improved impact properties.

2. Description of the Prior Art

Many different polyesters, modified to one extent or another, are known to the prior art. Polyethylene terephthalate (PET) is well known, and in view of its excellent physical properties and resistance to attack by chemicals is widely used commercially. Other polyesters such as polybutylene terephthalate (PBT) are also known, but not as widely accepted as PET.

One particular field of application for polyesters, and particularly polyethylene terephthalate, is the fiber industry. Therein, much of the modification of the polyesters is attempted in order to alter the spinning or mechanical properties of the polyesters, or the other properties important to films and fibers, e.g., such as improved dyeability. For example, see Muenster et al, U.S. Pat. No. 2,973,339, which discloses a process for the production of polyesters by reacting terephthalic acid or the dimethyl ester thereof with ethylene glycol and 5–30 mole percent (with respect to the terephthalic acid) of an aromatic glycol. The patent relates to a polyester useful in films and fibers.

Hrach et al, U.S. Pat. No. 3,651,016, discloses a process for the production of polyesters comprising reacting at least one lower alkyl ester of a dicarboxylic acid (including dimethyl terephthalate) with at least one diol selected from the group consisting of ethylene glycol, 1,4-butanediol, 1,4-(hydroxymethyl)-cyclohexane and 2,2'-bis(4'-beta-hydroxyethoxyphenyl)-propane. In Example 3 of the patent, there is disclosed the preparation of a polyester from a mixture of 200 parts terephthalic acid dimethyl ester, 150 parts ethylene glycol and 31.6 parts bisphenol A-diglycol ether. The result is an allegedly color stable polyester useful in forming films and filaments.

U.S. Pat. No. 4,067,850 issued to Kohler et al, discloses a process for the production of copolyesters by the transesterification of dimethyl terephthalate or the esterification of terephthalic acid with a glycol, such as ethylene glycol, in the presence of such quantity of bishydroxyethyl tetramethyl bisphenol A that the resulting polyester contains 4–15 weight percent of this bisphenol A in chemically co-condensed form. The filaments and fibers formed allegedly have improved dyeability properties.

Ohguchi et al, U.S. Pat. No. 4,377,682, discloses copolyesters formed from dicarboxylic acid components (which can include terephthalic acid and esters thereof) and an aliphatic glycol component containing mostly one or more glycols selected from ethylene glycol, tetramethylene glycol and 1,4-cyclohexane dimethanol, with a small portion of an additional glycol, and in addition small amounts of bisphenol A or bis-ethoxylated 2,2-bis(2,5-dimethyl-4-hydroxyphenyl)propane. The foregoing copolyesters are alleged to possess improved dyeability.

U.S. Pat. No. 3,972,852 issued to Inata et al, discloses a process of preparing aromatic polyesters from aromatic dicarboxylic acids or esters thereof (including terephthalic acid), diphenols and aliphatic dihydroxy compounds having 2 to 12 carbon atoms. The inclusion of the aliphatic dihydroxy compounds is said to permit the preparation of polyesters having a high deflection temperature under load as well as superior dimensional stability, thermal resistance and resistance to attack by chemicals.

See also Login, U.S. Pat. No. 4,263,370, which discloses graft polyesters prepared by grafting a monovinyl monomer to an unsaturated polyester which is the reaction product of at least one polycarboxylic acid reactant (including terephthalic acid and its esters) and at least on polyhydric alcohol reactant, with the provision that part of at least one of these reactants is alpha, beta-ethylenically unsaturated.

PBT is another known polyester, although generally not as widely employed a PET. A fire retardant PBT is known which comprises a brominated, ethoxylated bisphenol A component. Such polymers generally have a problem with color due to the bromine. The use of PBT in mechanical applications has been somewhat limited, however, as there is a need for a tougher PBT polyester, i.e., having improved impact properties. The prior art to date has not successfully addressed this problem. An improved, impact modified PBT type polymer would be of great commercial value to the industry.

It is an object of the present invention, therefore, to provide an impact modified polyester.

More particularly, it is an object of the present invention to provide an impact modified polybutylene terephthalate.

Another object of the present invention is to provide a polybutylene terephthalate copolyester having improved strength as well as improved impact toughness.

These and other objects, as well as the scope, nature and utilization of the invention, will be apparent to those skilled in the art from the following description, the Drawing and the appended claims.

SUMMARY OF THE INVENTION

Provided by the present invention is a copolyester prepared from the reaction of terephthalic acid or an ester derivative thereof with a diol component comprising a mixture of 1,4 butanediol and an alkoxylated bisphenol A. It is preferred that the terephthalic acid component is its methyl ester derivative, i.e., dimethyl terephthalate, and that the alkoxylated bisphenol A is ethoxylated bisphenol A (EBPA). The combination of the 1,4 butanediol and alkoxylated bisphenol A as the diol component provides for a polyester exhibiting superior impact properties, improved toughness, and at higher levels of alkoxylated bisphenol A, an amorphous (clear) polymer.

The proces for preparing the foreging copolyester comprises reacting the terephthalic acid or ester derivative thereof which a mixture of the 1,4 butanediol and alkoxylated bisphenol A. The reaction is preferably conducted in the presence of a catalyst and comprises first an esterification or ester interchange reaction, and then polymerization at a higher polymerization temperature.

BRIEF DESCRIPTION OF THE DRAWING

FIG. 1 is a graphical depiction of elongation at break vs. mole percent EBPA.

FIG. 2 is a graphical depiction of izod impact vs. mole percent EBPA.

FIG. 3 is a graphical depiction of tensile strength vs. mole percent EBPA.

FIG. 4 is a graphical depiction of flexural strength vs. mole percent EBPA.

FIG. 5 is a graphical depiction of flexural modulus vs. mole percent EBPA.

DETAILED DESCRIPTION OF THE PREFERRED EMBODIMENTS

The acid component employed in the preparation of the polyester of the present invention is terephthalic acid or an ester derivative thereof. It is preferred that an ester derivative of terephthalic acid be employed, with the methyl ester derivative, i.e., dimethyl terephthalate, being most preferred. However, other lower alkylester derivatives may be employed, e.g., ethyl, propyl and butyl terephthalates.

While it is preferred that the acid component be comprised wholly of terephthalic acid or an ester derivative thereof, it is within the scope of the present invention to employ small amounts of other dicarboxylic acid components, and preferably aromatic dicarboxylic acids. The amount is limited, however, so that the quality of the copolyester obtained is not impaired. Examples of suitable dicarboxylic acid esters include isophthalic acid, naphthalene dicarboxylic acid or their ester forming derivatives. The amount of such additional dicarboxylic acid component is generally limited to no more than about 5 mole percent of the carboxylic acid component.

The diol component, with which the terephthalic acid or ester derivative thereof is reacted, comprises a mixture of 1,4 butanediol and a alkoxylated bisphenol A. The alkoxylated bis phenol A is preferably a lower alkoxylated compound, i.e., from 1 to about 4 carbons in the alkoxy group. Ethoxylated bisphenol A is the most preferred alkoxylated bisphenol A for purposes of the present invention. It is also important that the bisphenol A be non-halogenated.

The amount of bisphenol A compound employed can be any amount sufficient to provide an improvement in the impact properties of polyester product, as compared to a polyester product containing none of the bisphenol A reaction component. Generally, the non-halogenated, alkoxylated bisphenol A will comprise from about 1% to about 25 mole % of the polymer, with the remainder of the diol component being comprised of the 1,4 butanediol. Special preference is given to having from 2 to about 8, and most preferably from about 4 to 6 mole % of alkoxylated bisphenol A in the polymer since such a combination of 1,4 butanediol and non-halogenated, alkoxylated bisphenol A surprisingly provides a polyester product showing improved impact properties and improved strength. When a more transparent product is desired, the amount of alkoxylated bisphenol A employed is preferably at least 20 mole % of the polymer.

The amount of total diol component employed in preparing the polyester of the present invention, as compared to the amount of acid component employed, is generally such that the mole ratio of diol/acid is between about 1.0/1.0 and 3.0/1.0. In general, it is preferred that the diol/acid molar ratio be greater than 1, with the ratio approaching 3 when a continuous or semicontinuous operation is employed in order to facilitate the feeding of the diol/acid slurry to the reaction.

The copolyesters of the present invention can generally be obtained by the usual processes employed in producing polyesters. For example, the conventional process comprising an ester-exchange reaction of the terephalate (dicarboxylic acid ester) with the diol component. The ester exchange-reaction is then followed by a polycondensation reaction to provide the polyester product. If the terephthalic acid is employed as the reaction component, a conventional process comprising esterification of the terephthalic acid and the diol component can be employed, followed by a polycondensation reaction.

As a general rule, the temperature of the reaction may lie anywhere between the normal boiling point of the diol component, and about 300° C. Above 300° C., it has generally found that decomposition becomes excessive and, consequently, it is most advantageous to complete the esterification reaction at a temperature close to that required for subsequent polycondensation. Generally, the temperature employed in the initial esterification or ester-exchange will be about 170° to 200° C. For the polymerization or polycondensation reaction subsequent thereto, the temperature is generally raised to about 225° to 275° C. It is preferred that the heating be effected under conditions such that any displaced alcohol can be removed from the reaction zone, usually by means of conventional distillation equipment. The heating is usually at atmospheric pressures, but higher or lower pressures may be used if desired. Preferably, the heating is also effected in an inert atmosphere, e.g., in the presence of an inert gas such as nitrogen or hydrogen.

During the initial reaction, the presence of a catalyst is generally preferred. Without the catalyst, the reaction generally proceeds very slowly. Any of the well known and conventional catalysts may be used, for example, lithium, sodium, potassium, calcium, beryllium, magnesium, zinc, cadmium, aluminum, chromium, molybdenum, manganese, iron, cobolt, nickel, copper, silver, mercury, tin, lead, bismuth, antimony, platinum and palladium. In some cases small amounts of an alkali metal may be used in combination with one of the foregoing metals, for example, from about 0.025% to 0.1% by weight.

The catalysts may be added in the form of powder, chips, shavings, ribbon, wire or in any other convenient form. The alkaline metals, the alkaline-earth metals or magnesium are conveniently used in the form of alcoholates, formed by dissolving them in the diol to be used or in another alcohol such as methyl or ethyl alcohol. Further, the alkaline metals may be used in the form of their carbonates or other alkaline reacting salts, for example the borates. Magnesium may also be used in the form of its oxide.

Other additives which may be used include delustrants, stabilizers, etc. Any conventional additive may be added to the reaction pot so that it is incorporated into the final polyester product.

After the initial reaction, the subsequent polymerization or polycondensation reaction takes place. As noted previously, the temperature is generally raised during this reaction. During the heating or during part of the heating, the pressure is also generally reduced so as to facilitate the rapid distillation of excess diol present. The pressure may be reduced in successive stages so that the heating begins at normal pressure, but is continued at a reduced pressure and is completed at a still further reduced pressure. Pressures from 20 down to 1 millimeter of mercury are particularly suitable. Higher or lower pressures may be used if desired. The reaction can also take place in its entirety at a pressure of about 1 millimeter of mercury or so. Metal catalysts may also be used and be present during this subsequent reaction. If desired, additional catalyst may be added prior to the polyermization.

During the heating, the melting point and the viscosity of the melt gradually increase. The temperature is maintained high enough to keep the mass in the molten state during the entirety of the heating period. Generally, the inherent viscosity is monitored during the polymerization reaction until the desired inherent viscosity is reached, which will determine the termination of the reaction.

The resulting polymer can therefore be molded into articles useful in mechanical applications. The molding can be achieved using any of the conventional molding operations.

The following Example is given as a specific illustration of the claimed invention and the advantages thereof. It should be understood, however, that the specific details set forth in the Example are merely illustrative and in no wise limitative. All parts and percentages in the Example and in the remainder of the specification are by weight unless otherwise specified.

EXAMPLE

Several polymerizations in accordance with the subject invention were performed in a 4 gallon stirred autoclave reactor. In each instance, the reactor was charged initially with dimethyl terephthalate, 1,4 butanediol, ethoxylated bisphenol A and catalyst. This mixture was heated to 175° C., where the ester interchange occurs and methanol is liberated. Upon completion of the reaction, i.e., little or no additional methanol was evolved, additional catalyst was then added and the solution was heated to 254° C. under 1.0 millimeter of mercury vacuum, whereupon polymerization occured. A product intrinsic viscosity (I.V.) was determined by agitator amp load increase during the polymerization. A stabilizer was added just before the target I.V. was achieved. Upon completion of the polymerization, the polymer was then gravity drained from the reactor through a strand bath and chopper.

Various samples of the polyester were then molded using a conventional molding apparatus, i.e., a 5 oz., 75 ton Van Dorn molding machine. Certain samples of the polymers were also compounded with 15% glass and molded. The physical properties of izod impact strength, flexural strength modulus, flexural strength stress, tensile strength, tensile elongation and Gardner impact strength were then measured for the various samples prepared, as well as for two additional control samples. The tensile measurements were made in accordance with ASTM D638–77a; the izod impact strength measurements were made in accordance with ASTM D256–78; the elongation measurements were made in accordance with ASTM D638–77a; and, the flexural strength measurements were made in accordance with ASTM D790–71. Control Sample A involved a conventional PBT polymer, i.e., no bisphenol A in the diol component, and control compound B employed 2.0 mole % of brominated bisphenol A with respect to the polymer.

The measured physical properties of the molded samples of the unfilled polymer are listed below in Table I. The physical properties of the molded samples of the filled polymer (15% glass) are noted below in Table II. As well, the different measured properties for the various samples are graphically depicted in FIGS. 1–5.

It is evident upon a review of the foregoing that the combination of alkoxylated bisphenol A with 1,4 butanediol as the diol component provides a polyester exhibiting a definite increase in impact properties. Furthermore, it is noted that when from about 2–8 mole %, and particularly from 4–6 mole %, alkoxylated, non-halogenated bisphenol A is employed, not only are the impact properties superior, but the tensile properties, i.e., the strength, are also improved.

TABLE I

PHYSICAL PROPERTIES-MOLDED SAMPLES, UNFILLED POLYMER

| Polymer Sample | EBPA, Mole % | Intrinsic Viscosity | Izod Impact Strength | Flexural Strength Mod × 10$^6$ | Flexural Strength Stress 5% | Tensile Strength (Yield/Break) | Tensile Elongation (Yield/Break) | Gardner Impact Strength |
|---|---|---|---|---|---|---|---|---|
| Control A[a] | 0 | 0.74 | 0.580 | 0.383 | 13,190 | 8545 | — 14.0 | — |
| 1 | 1.00 | 0.77 | 0.560 | 0.388 | 13,525 | 8220/8220 | 3.3/5.0 | 8.6 |
| Control B | 2.0[b] | 0.70 | 0.610 | 0.371 | 13,348 | 8630 | — 15.9 | — |
| 2A | 4.3 | 0.70 | 0.768 | 0.366 | 13,265 | 8570/7775 | 4.8/15 | 37.8 |
| 2B | 4.3 | 0.70 | 0.816 | 0.337 | 12,115 | 8395/3805 | 4.56/69 | 37.8 |
| 3 | 10.0 | 0.74 | 1.12 | 0.325 | 9,854 | 7430/2800 | 4.14/240 | 50.6 |

[a]Conventional PBT polymer
[b]2.0 mole percent brominated, ethoxylated bisphenol-A in polymer.

TABLE II

PHYSICAL PROPERTIES, MOLDED SAMPLES, FILLED POLYMER (15% GLASS)

| Polymer Sample | EBPA, Mole % | Izod Impact Strength | Flexural Strength Mod × 10$^6$ | Flexural Strength Stress 5% | Tensile Strength (Yield) | Tensile Elongation % (Yield) |
|---|---|---|---|---|---|---|
| Control C[c] | 0 | 0.89 | 0.781 | 22,349 | 12,840 | 3.10 |
| 4 | 1.0 | 0.91 | 0.803 | 22,599 | 13,440 | 3.22 |
| Control D | 2[d] | 1.11 | 0.833 | 23,629 | 14,800 | 3.27 |
| 5 | 4.3 | 1.14 | 0.824 | 20,640 | 14,170 | 3.15 |

TABLE II-continued
PHYSICAL PROPERTIES, MOLDED SAMPLES, FILLED POLYMER (15% GLASS)

| Polymer Sample | EBPA, Mole % | Izod Impact Strength | Flexural Strength | | Tensile | |
|---|---|---|---|---|---|---|
| | | | Mod × $10^6$ | Stress 5% | Strength (Yield) | Elongation % (Yield) |
| 6 | 10.0 | 1.54 | 0.680 | 13,615 | 10,980 | 4.19 |

[c] Conventional PBT polymer
[d] 2.0 mole percent brominated, ethoxylated bisphenol-A in polymer.

Although the invention has been described with preferred embodiments, it is to be understood that variations and modifications may be resorted to a will be apparent to those skilled in the art. Such variations and modifications are to be considered within the purview and the scope of the claims appended hereto.

What is claimed is:

1. A moldable copolyester prepared from the reaction of terephthalic acid or an ester derivative thereof with a diol component comprising a mixture of 1,4 butanediol and an alkoxylated, nonhalogenated bisphenol A.

2. The copolyester of claim 1, wherein terephthalic acid is a reaction component.

3. The copolyester of claim 1, wherein a lower alkyl ester derivative of terephthalic acid is a reaction component.

4. The copolyester of claim 3, wherein the ester derivative is dimethyl terephthalate.

5. The copolyester of claim 1, wherein the alkoxylated, nonhalogenated bisphenol A is ethoxylated bisphenol A.

6. The copolyester of claim 1, wherein the alkoxylated, nonhalogenated bisphenol A comprises from 1 to about 25 mole percent of the copolyester.

7. The copolyester of claim 6, wherein the alkoxylated, nonhalogenated bisphenol A comprises from 2 to about 8 mole percent of the copolyester.

8. The copolyester of claim 7, wherein the alkoxylated, nonhalogenated bisphenol A comprises from 4 to about 6 mole percent of the copolyester.

9. The copolyester of claim 6, wherein the alkoxylated, nonhalogenated bisphenol A comprises at least about 20 mole percent of the copolyester.

10. A copolyester prepared from the reaction of dimethyl terephthalate with a diol component comprising a mixture of 1,4-butanediol and exthoxylated bisphenol A.

11. The copolyester of claim 10, wherein the ethoxylated bisphenol A comprises from about 2 to about 8 mole percent of the copolyester.

12. A molded article for use in a mechanical application, the improvement comprising the article being molded from the copolyester of claim 1.

* * * * *

REEXAMINATION CERTIFICATE (1411th)
United States Patent [19]
Halmess et al.

[11] B1 4,725,664
[45] Certificate Issued Jan. 29, 1991

[54] IMPACT MODIFIED POLYESTER

[75] Inventors: C. B. Halmess, Kleberg; Lindsey C. Deal, Nueces, both of Tex.

[73] Assignee: Celanese Corporation

Reexamination Request:
No. 90/001,944, Feb. 22, 1990

Reexamination Certificate for:
Patent No.: 4,725,664
Issued: Feb. 16, 1988
Appl. No.: 889,053
Filed: Jul. 22, 1986

[51] Int. Cl.$^5$ .......................... C08G 63/60
[52] U.S. Cl. ...................... 528/176; 528/87; 528/100

[58] Field of Search ............ 528/87, 103, 110, 112, 528/176

[56] References Cited
U.S. PATENT DOCUMENTS 3,651,016  3/1972  Hrach et al. .................. 528/276
4,066,607  1/1978  Breitenfellner et al. ......... 524/602

*Primary Examiner*—John Kight, III

[57] ABSTRACT

Provided is an impact modified copolyester prepared from a reaction of an aromatic dicarboxylic acid component and a diol component. The aromatic dicarboxylic acid component is terephthalic acid or an ester derivative thereof, and the diol component comprises a mixture of 1,4 butanediol and an alkoxylated bisphenol A. The combination of the 1,4 butanediol and alkoxylated bisphenol A provides for a polyester exhibiting superior impact properties.

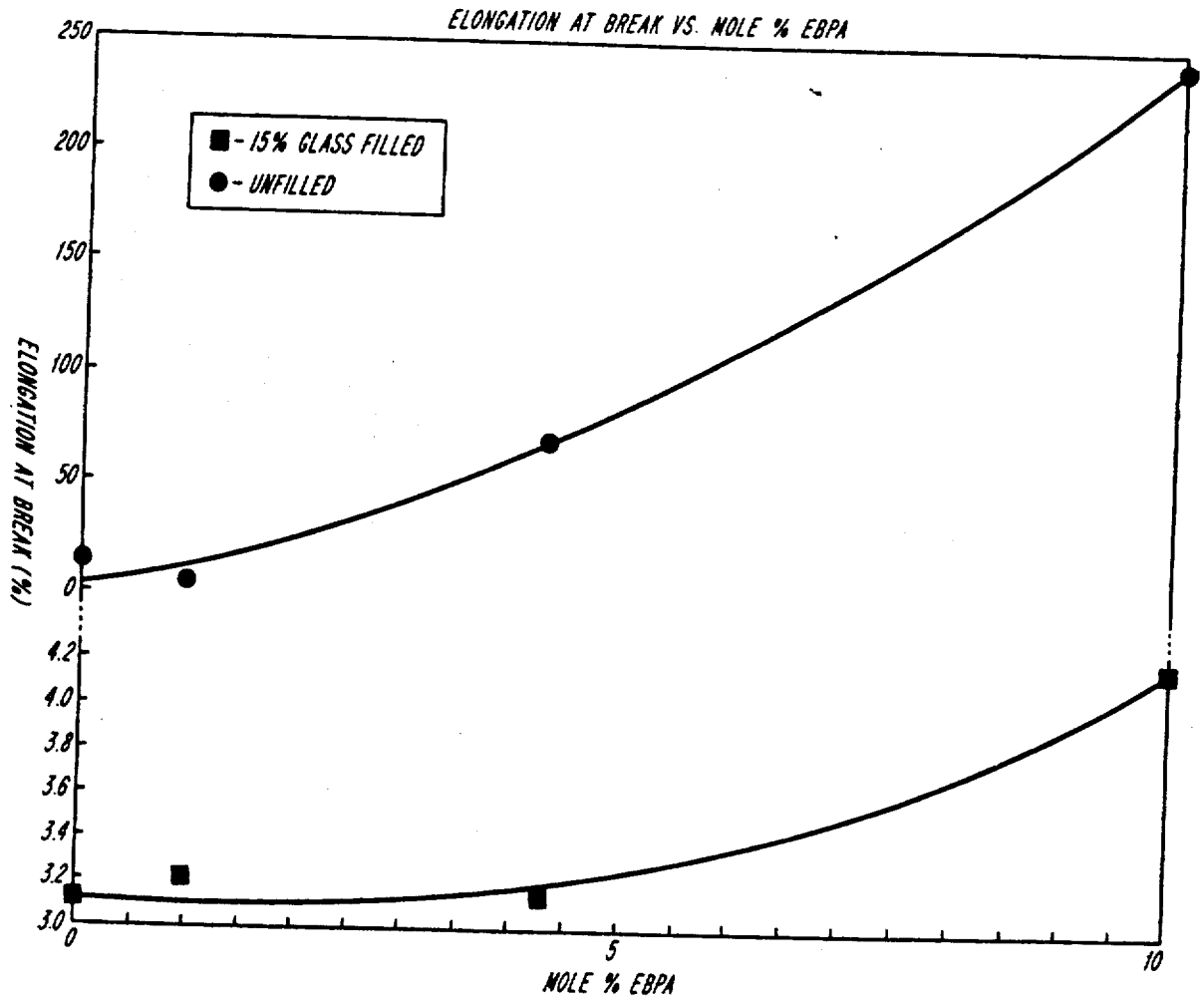

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-12 are cancelled.

* * * * *